United States Patent Office 2,914,519
Patented Nov. 24, 1959

2,914,519

POLYMERIZATION OF ETHYLENE WITH A CATALYST OF ALKYLALUMINUM AND A V-A METAL SALT

Edwin J. Vandenberg, Wilmington, Del., assignor to Hercules Powder Company, Wilmington, Del., a corporation of Delaware No Drawing. Application March 19, 1957
Serial No. 646,960

10 Claims. (Cl. 260—94.9)

This invention relates to the polymerization of ethylene under relatively mild conditions of pressure and temperature, and more particularly to a new catalyst for the polymerization of ethylene under such conditions.

K. Ziegler has described the polymerization of ethylene with organometallic compounds of the metals of group III–A of the periodic table, i.e., organometallic compounds of aluminum, gallium and indium to produce polymers varying in molecular weight from dimers up to the wax range polymers. He has also described the preparation of high molecular weight crystalline polymers by contacting ethylene with a mixture of an organoaluminum compound and a compound of a metal group IV–B, V–B, VI–B or VIII of the periodic table.

Very surprisingly, it has now been discovered that ethylene may be polymerized with a catalyst formed by mixing an organometallic compound of a metal of groups I–A, II–A or III–A of the periodic table with a salt of a group V–A metal, i.e., an arsenic, antimony or bismuth salt. It was entirely unexpected that an organometallic compound of a metal of one of the main groups of the periodic table could react with a salt of a metal of another main group of the periodic table to produce a catalyst that was effective for the polymerization of ethylene under mild conditions of temperature and pressure.

The polymerization of ethylene in accordance with this invention may be carried out in a wide variety of ways. It may be carried out as a batch or continuous operation and generally is carried out in the presence of an inert organic diluent as the reaction medium. Any inert liquid organic solvent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated hydrocarbons such as methylene chloride, ethylene chloride, chloroform, carbon tetrachloride, chlorobenzene, etc.

The polymerization of ethylene in accordance with this invention may be carried out by forming the catalyst in situ, i.e., adding first one catalyst component followed by the other, or adding the two catalyst components simultaneously to the ethylene, or a preformed catalyst may be used by mixing the group V–A metal salt with the organometallic compound, usually in an inert organic diluent, and then adding the ethylene to the preformed catalyst. Obviously, many other variations in the process may be made, for example, either one or both components of the catalyst may be added in increments during the polymerization.

Any salt of the group V–A metal, i.e., arsenic, antimony or bismuth, may be used as one of the catalyst components in accordance with this invention. The salt may be an inorganic or organic salt, etc. Exemplary of the antimony, arsenic and bismuth salts that may be used are antimony trichloride, antimony pentachloride, antimony tribromide, antimony pentachloride bromide, antimonous oxychloride, antimonic oxychloride, antimonous sulfate, arsenic bromide, arsenous chloride, arsenous oxychloride, arsenic pentachloride, bismuth acetate, bismuth chloride, bismuth bromide, bismuth dichloride, bismuth oxychloride, bismuth phosphate, bismuth sulfate, etc. Of particular value are the halides of these metals. It is usually desirable to use these metal salts in the form of a solution or suspension in a diluent, as for example, a diluent of the type used in the polymerization process or to use them in a finely divided form such as is obtained by grinding by any desired means, as for example, in a pebble mill, ball mill, etc.

The organometallic compound that is reacted with the group V–A metal salt may be any organo compound of an alkali metal, alkaline earth metal, or earth metal. Particularly effective are the organoaluminum compounds such as the alkylaluminum compounds. Exemplary of the organometallic compounds that may be used are alkali metal alkyls or aryls such as butyllithium, amylsodium, phenylsodium, etc., dimethylmagnesium, diethylmagnesium, diphenylmagnesium, butylmagnesium chloride, phenylmagnesium bromide, and aluminum compounds such as trimethylaluminum, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organoaluminum compounds, as for example, sodium aluminum tetraethyl, lithium aluminum tetraoctyl, etc., aluminum hydride, and complexes of aluminum hydride such as lithium aluminum hydride. As in the case of the group V–A metal salt, if the organometallic compound is not at least partially soluble in the diluent used for the polymerization process, it may be desirable to ball-mill or otherwise finely divide the compound prior to its use in the process.

When the group V–A metal salt and the organometallic compound are mixed in the preparation of the catalyst, a reaction takes place, the nature of which is not completely understood. Nevertheless, the catalyst so produced is extremely effective for the polymerization of ethylene. The molar ratio of the group V–A metal salt to the organometallic compound may be varied over a wide range and will depend on the type of organometallic compound that is mixed with the particular group V–A metal compound. In general, the molar ratio of the organometallic compound to the group V–A metal compound will be from about 0.1:1 to 100:1 and more usually will be from about 0.3:1 to 10:1.

The selection of the temperature and pressure used for the polymerization process will obviously depend upon the activity of the catalyst system being used, the degree of polymerization desired, etc. In general, the polymerization will be carried out at room temperature or slightly above, but any temperature within the range of from about —50° C. to about 150° C., preferably from about —20° C. to about 120° C. and more preferably from about 20° C. to about 100° C. may be used. In the same way, while atmospheric pressure or a pressure of only a few pounds may be used, the polymerization may be carried out over a wide range of pressures, but higher pressures do not appreciably alter the course of the polymerization and, hence, are not required.

As will be obvious from the following examples, many variations may be made in the process of this invention. For example, in many instances, it may be desirable to add a viscosity-reducing agent such as hydrogen, etc., to reduce the viscosity of the polymer that is obtained. In some cases, oxygen may function as an activator or other desirable function and may be added.

The following examples will demonstrate the process of polymerizing ethylene in accordance with this invention and some of the many modifications that can be made in this process. The molecular weight of the polymers produced in these examples is indicated by the reduced specific viscosity (RSV) given. By the term "reduced specific viscosity" is meant the $\eta$ Sp/C determined on an 0.1% solution of the polymer in decalin, containing 0.1 g. of the polymer per 100 ml. of solution (unless otherwise indicated), at 135 C. All parts and percentages are by weight unless otherwise indicated.

EXAMPLES 1–4

In each of these examples polymerization vessels, freed from air, were charged with the diluent (about 35 parts of n-heptane in Examples 1, 3 and 4 and about 40 parts of toluene in Example 2) and 2 parts of gaseous ethylene. The initial pressure in each case was about 50 p.s.i.g. The alkylaluminum compound dissolved in n-heptane was added and after equilibrating at 30° C., the group V–A metal salt was then added. The bismuth trichloride used in Example 1 was ball-milled in n-heptane and in Example 2 was ground with glass beads in a glass container to a particle size of 1–3 microns in n-heptane. The antimony trichloride used in Example 3 was ball-milled in n-heptane whereas the antimony pentachloride used in Example 4 was added as a 1 M solution in carbon tetrachloride. The group V–A metal salt, the aluminum compound, and the amount of each expressed as millimoles per liter, and the reaction time are set forth in the following table. After the indicated number of hours at 30° C., the polymerization was stopped by adding 4 parts of ethanol. The insoluble polymer that had separated was then isolated by filtration, refluxed with a 10% solution of hydrogen chloride in methanol, washed with methanol until neutral, and then dried. The RSV's of some of the polyethylenes so obtained are set forth in the table. (The polyethylenes produced in Examples 3 and 4 were too insoluble in decalin to measure.) The polyethylenes obtained in Examples 1 and 2 were crystalline as shown by their X-ray diffraction pattern.

As may be seen from the foregoing examples, the process of this invention makes it possible to polymerize ethylene and produce polyethylenes of high or low molecular weight and of varying degrees of solubility as desired.

The periodic able referred to in the specification and claims is that set forth in the "Handbook of Chemistry and Physics," published by the Chemical Rubber Publishing Company, pages 392–393 of the 36th edition.

What I claim and desire to protect by Letters Patent is:

1. The process of polymerizing ethylene which comprises contacting ethylene with a catalyst formed by mixing an alkylaluminum compound with a salt of a metal of group V–A of the periodic table, and recovering a polymer of ethylene.
2. The process of claim 1 wherein the group V–A metal salt is an antimony salt.
3. The process of claim 1 wherein the group V–A metal salt is a bismuth salt.
4. The process of claim 2 wherein the antimony salt is antimony trichloride.
5. The process of claim 2 wherein the antimony salt is antimony pentachloride.
6. The process of claim 3 wherein the bismuth salt is bismuth trichloride.
7. The process of polymerizing ethylene which comprises contacting ethylene with a catalyst formed by mixing antimony trichloride with ethylaluminum dichloride, and recovering a polymer of ethylene.
8. The process of polymerizing ethylene which comprises contacting ethylene with a catalyst formed by mixing antimony pentachloride with ethylaluminum dichloride, and recovering a polymer of ethylene.
9. The process of polymerizing ethylene which comprises contacting ethylene with a catalyst formed by mixing bismuth trichloride with triethylaluminum, and recovering a polymer of ethylene.
10. The process of polymerizing ethylene which comprises contacting ethylene with a catalyst formed by mixing an alkylaluminum compound with a metal salt selected from the group consisting of bismuth trichloride, antimony trichloride and antimony pentachloride, and recovering a polymer of ethylene.

Table

| Example | Group V–A Metal Salt | mmole/l. | Alkylaluminum Compound | mmole/l. | Diluent | Reaction Time, Hrs. | RSV |
|---|---|---|---|---|---|---|---|
| 1a | $BiCl_3$ | 20 | $Al(C_2H_5)_3$ | 40 | n-heptane | 19 | [1] 24 |
| b | $BiCl_3$ | 20 | $Al(C_2H_5)_2Cl$ | 60 | ---do--- | 19 | |
| c | $BiCl_3$ | 20 | $Al(C_2H_5)Cl_2$ | 60 | ---do--- | 19 | >2.0 |
| 2a | $BiCl_3$ | 20 | $Al(C_2H_5)_3$ | 40 | toluene | 19 | |
| b | $BiCl_3$ | 20 | $Al(C_2H_5)_2Cl$ | 60 | ---do--- | 19 | |
| c | $BiCl_3$ | 20 | $Al(C_2H_5)Cl_2$ | 60 | ---do--- | 19 | |
| 3a | $SbCl_3$ | 20 | $Al(C_2H_5)_3$ | 40 | n-heptane | 19 | |
| b | $SbCl_3$ | 20 | $Al(C_2H_5)_2Cl$ | 60 | ---do--- | 19 | |
| c | $SbCl_3$ | 20 | $Al(C_2H_5)Cl_2$ | 60 | ---do--- | 2.4 | |
| 4a | $SbCl_5$ | 20 | $Al(C_2H_5)_3$ | 40 | ---do--- | 19 | |
| b | $SbCl_5$ | 20 | $Al(C_2H_5)_2Cl$ | 60 | ---do--- | 1 | |
| c | $SbCl_5$ | 20 | $Al(C_2H_5)Cl_2$ | 60 | ---do--- | 19 | >0.1 |

[1] Measured as an 0.05% solution in decalin.

References Cited in the file of this patent

UNITED STATES PATENTS

| | | |
|---|---|---|
| 2,085,535 | Langedijk et al. | June 29, 1937 |
| 2,406,869 | Upham | Sept. 3, 1946 |
| 2,827,445 | Bartolomeo et al. | Mar. 18, 1958 |

FOREIGN PATENTS

| | | |
|---|---|---|
| 540,459 | Belgium | Aug. 31, 1955 |
| 716,159 | France | Dec. 16, 1931 |